US009330191B2

(12) United States Patent
Teevan et al.

(10) Patent No.: US 9,330,191 B2
(45) Date of Patent: May 3, 2016

(54) IDENTIFYING CHANGES FOR ONLINE DOCUMENTS

(75) Inventors: Jaime Teevan, Bellevue, WA (US);
Susan Dumais, Kirkland, WA (US);
Daniel Liebling, Seattle, WA (US);
Richard Hughes, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1240 days.

(21) Appl. No.: 12/484,607

(22) Filed: Jun. 15, 2009

(65) Prior Publication Data

US 2010/0318892 A1    Dec. 16, 2010

(51) Int. Cl.
*G06F 17/00* (2006.01)
*G06F 17/30* (2006.01)

(52) U.S. Cl.
CPC .................................. *G06F 17/3089* (2013.01)

(58) Field of Classification Search
CPC ........................ G06F 17/2211; G06F 17/2247
USPC ........................................ 715/200, 229, 234
See application file for complete search history.

(56) References Cited

U.S. PATENT DOCUMENTS

| | | | |
|---|---|---|---|
| 6,012,087 A | 1/2000 | Freivald et al. | |
| 6,377,957 B1* | 4/2002 | Jeyaraman | 707/625 |
| 6,560,620 B1* | 5/2003 | Ching | 715/229 |
| 6,848,078 B1* | 1/2005 | Birsan et al. | 715/206 |
| 6,931,590 B2* | 8/2005 | Kanie et al. | 715/234 |
| 6,954,766 B2* | 10/2005 | Ouchi | |
| 7,260,773 B2* | 8/2007 | Zernik | 715/229 |
| 7,383,334 B2* | 6/2008 | Wong et al. | 709/224 |
| 7,487,190 B2* | 2/2009 | Black et al. | |
| 2003/0195963 A1* | 10/2003 | Song et al. | 709/227 |
| 2004/0093347 A1* | 5/2004 | Dada | 707/103 R |
| 2005/0108418 A1 | 5/2005 | Bedi et al. | |
| 2006/0064467 A1 | 3/2006 | Libby | |
| 2007/0150556 A1 | 6/2007 | Fukuda et al. | |
| 2008/0120368 A1* | 5/2008 | Gale et al. | 709/203 |
| 2008/0147851 A1 | 6/2008 | Le et al. | |
| 2008/0178117 A1* | 7/2008 | Gelman et al. | 715/808 |
| 2008/0195674 A1 | 8/2008 | Kim et al. | |
| 2009/0198677 A1* | 8/2009 | Sheehy et al. | 707/5 |
| 2010/0005053 A1* | 1/2010 | Estes | 707/1 |

OTHER PUBLICATIONS

"Web Page Differ", http://sourceforge.net/projects/webdiffer/.
"Web Page Changes Viewer", 1999-2009, http://sourceforge.net/projects/wpcv/#item3rd-1.

(Continued)

*Primary Examiner* — Manglesh M Patel
(74) *Attorney, Agent, or Firm* — Florin Corie; Cassandra Swain; Micky Minhas

(57) ABSTRACT

Techniques and systems are disclosed for providing changed content identification for an online document that is accessed by a user or user agent. A reference point for an online document that a user or user agent is interested in accessing is identified, comprising a stored prior version of the document. The prior version of the document is retrieved, when the user or user agent accesses the online document, such as by using the reference point. Elements of the prior version are compared with elements of a current version of the document, to determine whether there are differences between the versions. If changes are identified between the prior version and the current version, the current version is automatically updated with visual or auditory representations that identify those changes of content.

20 Claims, 7 Drawing Sheets

(56) References Cited

OTHER PUBLICATIONS

"WebWatcher", 1999-2009, http://sourceforge.net/projects/webwatcher/.

"DeltaSpy 1.7", 2006, pp. 1-2, http://www.qweas.com/download/internet/web_browser_tools/deltaspy.htm.

"Versionista Launches Integrated Web Versioning", Jan. 25, 2009, http://versionista.com/introducing-revision-history.shtml.

Adar et al., "Zoetrope: Interacting with the ephemeral Web.", Oct. 19-22, 2008, Monterey, CA, USA, http://portal.acm.org/citation.cfm?id=1449715.1449756.

Adar et al., "Resonance on the Web: Web dynamics and revisitation patterns", Apr. 4-9, 2009, Boston, MA, USA, http://people.csail.mit.edu/teevan/work/publications/papers/chi09-resonance.pdf.

Bharat et al., "Mirror, mirror on the Web: A study of host pairs with replicated content", http://www.cumbrowski.com/carstenc/pdf/Mirror_Mirror_on_the_Web-A_Study_of_Host_Pairs-with_Replicated_Content.pdf.

Bucy et al., "Formal features of cyberspace: Relationships between Web page complexity and site traffic", 1999-2009 John Wiley & Sons, Inc., http://www3.interscience.wiley.com/journal/66001487/abstract?CRETRY=1&SRETRY=0.

Liu et al., "WebCQ: Detecting and delivering information changes on the Web", Washington, DC USA, 2000, http://www.tangwei.net/papers/final-cikm00.pdf.

Liu et al., "Information monitoring on the Web: A scalable solution", International Conference on Information and Knowledge Management (CIKM), Nov. 7-10, 2000, Washington D.C., ACM Press, pp. 512-519, http://www.cc.gatech.edu/projects/disl/CQ/papers/wwwj.pdf.

Nadamoto, et al., "A Comparative Web Browser (CWB) for browsing and comparing Web pages", WWW2003, May 20-24, 2003, Budapest, Hungary, pp. 727-735, http://portal.acm.org/citation.cfm?id=775152.775254.

Ntoulas et al., "What's new on the Web? The evolution of the Web from a search engine perspective", WWW2004, May 17-22, 2004, New York, New York, USA, http://www.cs.cmu.edu/~olston/publications/webstudy.pdf.

Obendorf et al., "Web page revisitation revisited: Implications of a long-term click-stream study of browser usage", Apr. 28-May 3, 2007, San Jose, California, pp. 597-606, http://portal.acm.org/citation.cfm?doid=1240624.1240719

Palme et al., "MIME encapsulation of aggregate documents, such as HTML (MHTML)", The Internet Society (1999), pp. 1-25, http://www.rfc-editor.org/rfc/rfc2557.txt.

Pixley, Tom, "Document Object Model events", Nov. 13, 2000, pp. 1-18, http://www.w3.org/TR/DOM-Level-2-Events/events.html.

Tauscher, et al., "How people revisit Web pages: Empirical findings and implications for the design of history systems", 1997 Academic Press Limited, pp. 97-137, http://grouplab.cpsc.ucalgary.ca/grouplab/uploads/Publications/Publications/1997-RevisitWeb.IJHCS.pdf.

Teevan et al., "Information re-retrieval: Repeat queries in Yahoo's logs", SIGIR'07, Jul. 23-27, 2007, Amsterdam, The Netherlands, http://www.cond.org/sigir07.pdf.

Weinreich et al., "Not quite the average: An empirical study of Web use", ACM Transactions on the Web, vol. 2, No. 1, Article 5, Publication date: Feb. 2008, http://portal.acm.org/citation.cfm?doid=1326561.1326566.

Catledge et al., "Characterizing browsing strategies in the World-Wide Web", http://www.viktoria.se/~dixi/BISON/resources/catledge-pitkow%201995.pdf.

Cho et al., "The evolution of the Web and implications for an incremental crawler", pp. 1-21, http://net.pku.edu.cn/~wbia/2004/public_html/Readings/web%20dynamics/The%20Evolution%20of%-20the%20Web%20and%20Implications%20for%20an%20incremental%20Crawler(2000).pdf.

Cockburn et al., "What do Web users do? An empirical analysis of Web use", Int. J. Human-Computer Studies (2000), http://www.cosc.canterbury.ac.nz/andrew.cockburn/papers/ijhcsAnalysis.pdf.

Douglis et al., "Rate of change and other metrics: A live study of the World Wide Web", USENIX Symposium on Internetworking Technologies and Systems, Dec. 1997, http://citeseerx.ist.psu.edu/viewdoc/download?doi=10.1.1.85.4216&rep=rep1&type=pdf.

Esposito, Dino, "Browser Helper Objects: The browser the way you want it", 1999, pp. 1-8, http://msdn.microsoft.com/en-us/library/bb250436(printer).aspx.

Fetterly et al., "A large-scale study of the evolution of Web pages", WWW2003, May 20-24, 2003, Budapest, Hungary, pp. 669-678, http://portal.acm.org/citation.cfm?id=775152.775246.

Foster et al., "Serendipity and information seeking: An empirical study", http://cadair.aber.ac.uk/dspace/bitstream/2160/292/5/foster%20and%20ford%20paper%20JD114c.pdf.

Hupp Danis, "Smart Bookmarks: Automatic retroactive macro recording on the Web", Department of Electrical Engineering and Computer Science, May 11, 2007, http://groups.csail.mit.edu/uid/projects/bookmarker/thesis.pdf.

Jatowt et al., "What can history tell us? Towards different models of interaction with document histories", HT'08, Jun. 19-21, 2008, Pittsburgh, Pennsylvania, USA, pp. 5-14, http://portal.acm.org/citation.cfm?id=1379092.1379098.

Jones et al., "Query word deletion prediction", SIGIR'03, Jul. 28-Aug. 1, 2003, Toronto, Canada, http://www.cs.cmu.edu/~rosie/papers/jonesSIGIR2003Query.pdf.

Kellar et al., "An exploration of Web-based monitoring: Implications for design", CHI 2007, Apr. 28-May 3, 2007, San Jose, California, USA, pp. 377-386, http://portal.acm.org/citation.cfm?id=1240686.

Levering et al., "The portrait of a common HTML Web page", DocEng'06, Oct. 10-13, 2006, Amsterdam, The Netherlands, http://portal.acm.org/citation.cfm?id=1166213.

Linderman, MAtthew, "Web interface design tip: The yellow fade technique", Feb. 19, 2004, pp. 1-7, http://www.37signals.com/svn/archives/000558.php.

* cited by examiner

IDENTIFYING CHANGES FOR ONLINE DOCUMENTS

BACKGROUND

The online environment, including both the Internet and plurality of intranets, can be very dynamic where content is continually uploaded, changed, updated, removed, etc. Documents, such as web-pages, online work-processor type files, PDF files, and other representations of documents can be available online and accessible to users. Often, users search for particular content, and/or access particular web-sites for particular purposes. Some web-sites provide updated content on a regular basis, such as news sites, blogs, discussion boards, and retailer sale sites to name a few. Further, users may be particularly interested in important content that changes over time, such as times and dates of events, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Online content can change regularly and users can revisit online content frequently. For example, users often revisit websites to see if content of a web-page has changed, such as news content, blog updates, and more. However, tools used to access online content, such as web-browsers and search engines, do little to explicitly support dynamic content changes. Typically, when a user visits a colleague's website new papers that the colleague may have posted do not readily identify themselves to the user. Web-based tools usually deal with merely a single time slice of content available online. For example, browsers show users a current version of a page, and search engines use a single version that was indexed from a most recent crawl of the web.

Previous and current techniques and systems that attempt to identify changes in online content include Internet archive services and some search engines that provide access to historical version of web pages to users, where the user must explicitly request prior versions and identify changes on their own. Further, some services provide notifications of changes to web content to user who subscribe to the service for specific pages. Additionally, some store multiple versions of pages and attempt to identify changes and provide links to prior content and mapping of change representations for a current page, for specifically identified pages. Others attempt to show changes by providing side-by-side comparisons or integrated views of versions, requiring that users switch from browsing to comparison views.

Techniques and systems are disclosed that provide identification of changes to online documents to users or user agents, supporting awareness of changes when pages are revisited, for example, or compared with prior archived versions. The identification of changes can be provided in a lightweight, unobtrusive way that augments web browsing and may not interfere with a user's online browsing experience. Further, the change identification can be present while the user or user agent browses online, automatically making users aware of changes when they are identified, for example.

In one embodiment for providing changed content identification for an online document that is accessed by a user or user agent, a reference point for an online document that a user or user agent is interested in accessing can be identified, which references a stored prior version of the document, such as one that existed and was cached. When the user or user agent accesses the online document, the prior version of the document can be retrieved, for example, by using the reference point (e.g., retrieving the document from a local cache). Elements of the prior version can be compared with elements of a current version of the document, to determine whether there are differences between the versions. If changes are identified between the prior version and the current version, the current version can automatically be updated with visual or auditory representations, such as highlighting of changed text, which identifies those changes of content.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
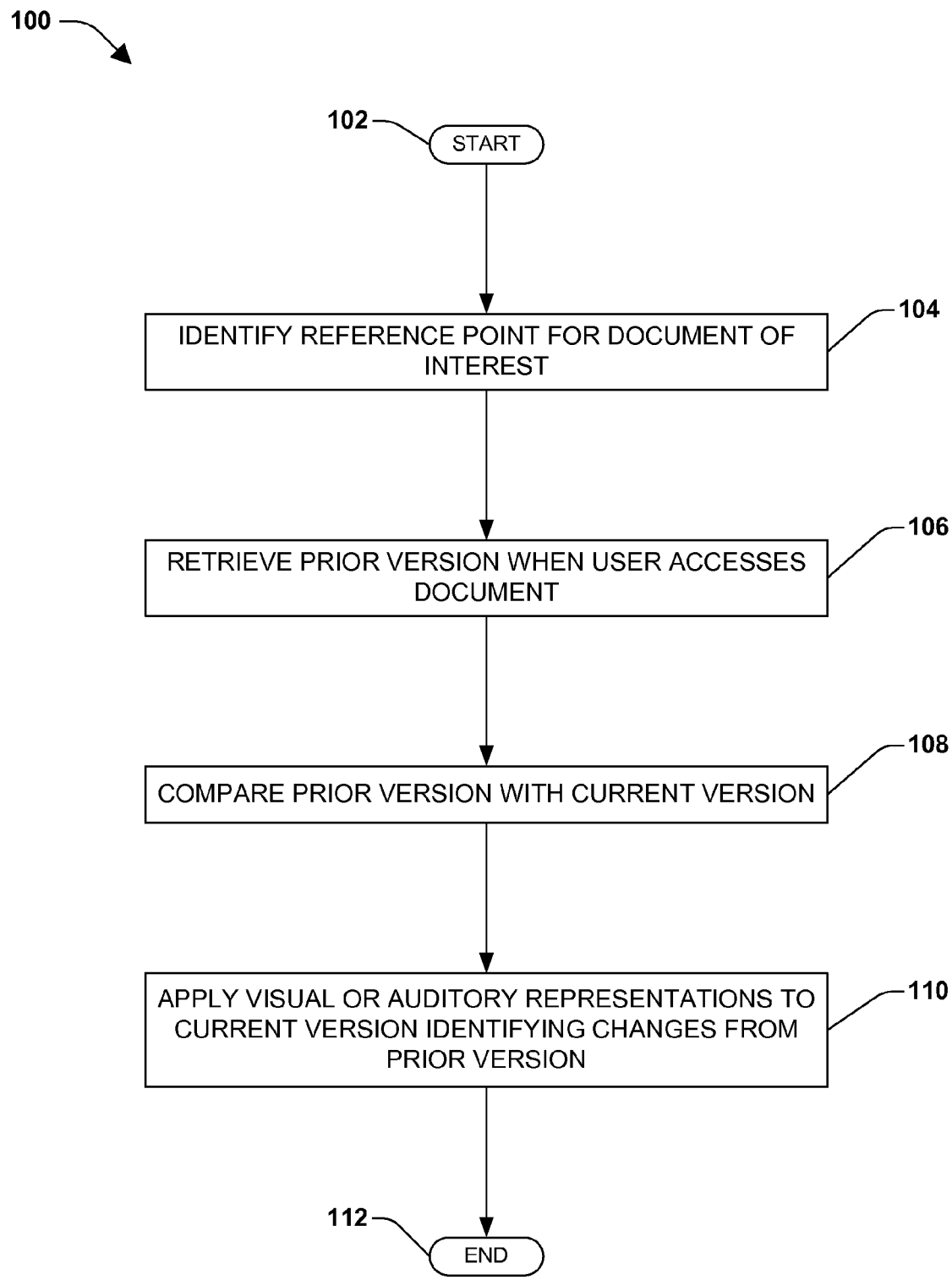
FIG. 1 is a flow-chart diagram of an exemplary method for providing changed content identification for an online document that is accessed by a user.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that can provide awareness to users that some content has changed in an online document (e.g., web-page), for example, since a last time they accessed the document online or from a prior version. Changes in the content can be indicated to user without interfering with an existing web-browsing experience, for example. FIG. 1 is a flow-chart diagram of an exemplary method 100 for providing changed content identification for an online document that is accessed by a user.

The exemplary method 100 begins at 102 and involves identifying one or more reference points for an online document that a user or user agent (e.g., to allow programmable access using an agent) may be interested in accessing, at 104, where a stored prior version of the online document is available for the reference point. For example, a reference point may be a point-in-time and a stored prior version of the document may be available from that point-in-time. In this example, the reference point can be used to access the document stored at that point-in-time.

At 106, the prior version of the document is retrieved when the user or user agent accesses the online document. In one embodiment, accessing the online document can comprise browsing to the document on the Internet, such as by accessing a web-page. Web-pages often contain content that is changed periodically, for example, so when a user or user agent accesses a current version of the web-page it may have different content than when the user or user agent previously accessed that page. In this example, when the user or user agent accesses a current version of the web-page, the prior version can be retrieved from the reference point, such as from a local cache or an online storage location.

At 108, elements of the prior version of the online document are compared with elements of a current version of the document. An online document can be broken down into elements, for example, in a variety of ways, depending on a type of document. In one embodiment, the document (e.g., a web-page) may comprise a graphical structure representation, such as a document object model (DOM) tree-graph comprising DOM elements for the document. In this embodiment, for example, a DOM-tree for the prior version can be compared with a DOM-tree for the current version to determine whether there are differences between the elements (e.g., structure, location, content, etc.) of the two versions.

In one aspect, comparing the elements of the versions may comprise comparing merely those elements that are of interest to the user or user agent. As an example, a user may only be interested in detecting changes between versions for particular items, and ignoring other items, such as those that change often, or are inconsequential (e.g., ads, graphics, etc.), or those that are of little interest to the user (e.g., discussions on topics that are not relevant to user's tasks). In another embodiment, a user may wish to ignore changes for entire types of documents, for example, where an entire page changes, or where the user may have security concerns about storing prior versions of secure documents.

In one embodiment, identifying merely those elements of interest to the user can comprise identifying elements that have been selected by the user, for example, for which the user has particular interest. In this example, the user may be able to select items to identify if they have changed between versions. Further, in one embodiment, elements of interest to the user can be based on regions of inferred relevance, for example, by distinguishing between areas of a page that comprise content and areas that are non-content (e.g., ads, graphics, etc.). Additionally, in one embodiment, elements of interest to the user can be based on the user's document accessing patterns, such as when a user continually accesses a blog site to check for updates, merely those changes to updated blogs can be identified based the user's prior visitation pattern. Also, in one embodiment, elements of interest to the user can be based on global document accessing patterns, such as by tracking how a user utilizes the Internet (e.g., what pages they visit, how often, what for, content, etc.), to infer which changes the user may be interested in identifying.

At 110, in the exemplary method 100, the current version of the document is automatically updated with visual or auditory representations that identify changes to the content, from the prior version to the current version. It will be appreciated, however, that identifying changes as provided herein does not entail changing content, merely identifying changes to such content. In one embodiment, updating the current version can comprise changing a visual or auditory representation of a changed element on the current version, for example, where the element is different between the prior and current versions. Visual or auditory representations can be identifiers for a user or user agent that content has changed between the prior and current versions of the document. For example, a change identifying visual or auditory representation can be something that distinguishes the changed content from how the current version is represented.

As an example, elements that are different between the versions can be highlighted, where a different background color distinguishes the changes from a normal background color for the document. Other examples of static representations can include, changing a color of font, changing a size of font, bolding the change, drawing lines around the change, using some pointers to focus the change to the user, or some combination of these. Examples of dynamic visual representations can include, fading the element between the prior version and the current version, changing the visual representation of the changed element then fading to a typical representation, using dynamic graphics, or some combination. Examples of auditory representations may be distinguishing sounds that identify changes when an element is selected or represented on a display. The methods and systems described herein are not limited to the above embodiments for visually representing changed elements in a document. It is anticipated that those skilled in the art may devise alternatives to these embodiments.

Having updated the current version of the online document with visual representations of changes from the prior version, the exemplary method 100 ends at 112.

Figure 2:
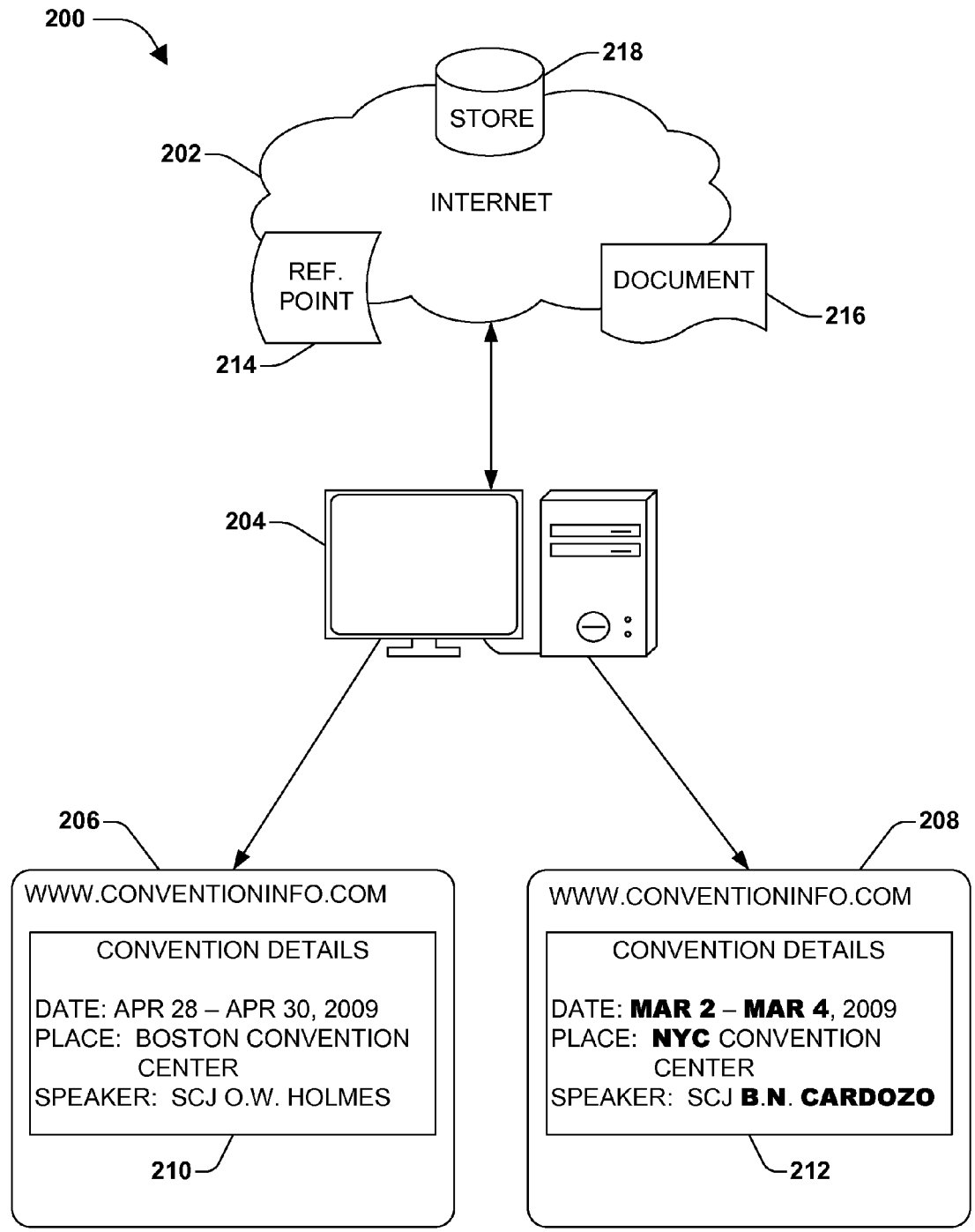
FIG. 2 is an illustration of an exemplary environment where the one or more methods and/or systems described herein can be implemented

FIG. 2 is an illustration of an exemplary environment 200 where the one or more methods and/or systems described herein can be implemented, such as the exemplary method 100 described in FIG. 1. A user can use a computer 204 to access the Internet 202, such as to access a particular document 216 (e.g., web-page) to view its content. Typically, online documents 216 are stored on remote storage systems 218, such as the document owner's server or a server farm used for web-content storage.

In this example 200, a reference point 214 may comprise an existing version of the document 216, for example, that was available at a particular time. In one embodiment, the reference point 214 can be a global reference point, such as a point-in-time or particular version of the document 216 that is merely available online, and is stored remotely 218, such as on a remote server. In another embodiment, the reference point 214 may be a local reference point, such as a particular version of the document 216 that is stored locally on storage in the computer 204.

In this example 200, when the user accesses the document 216 online, the prior version 206 is retrieved, as described above, along with the current version 208. Elements of the content 210 and 212 for the two versions can be compared to determine if there are differences. In this example, the convention details in the content 212 current version 208 comprise changes to the date, place, and speaker, which have been bolded in the illustrated example to draw the user's attention to the changed elements.

Figure 3:
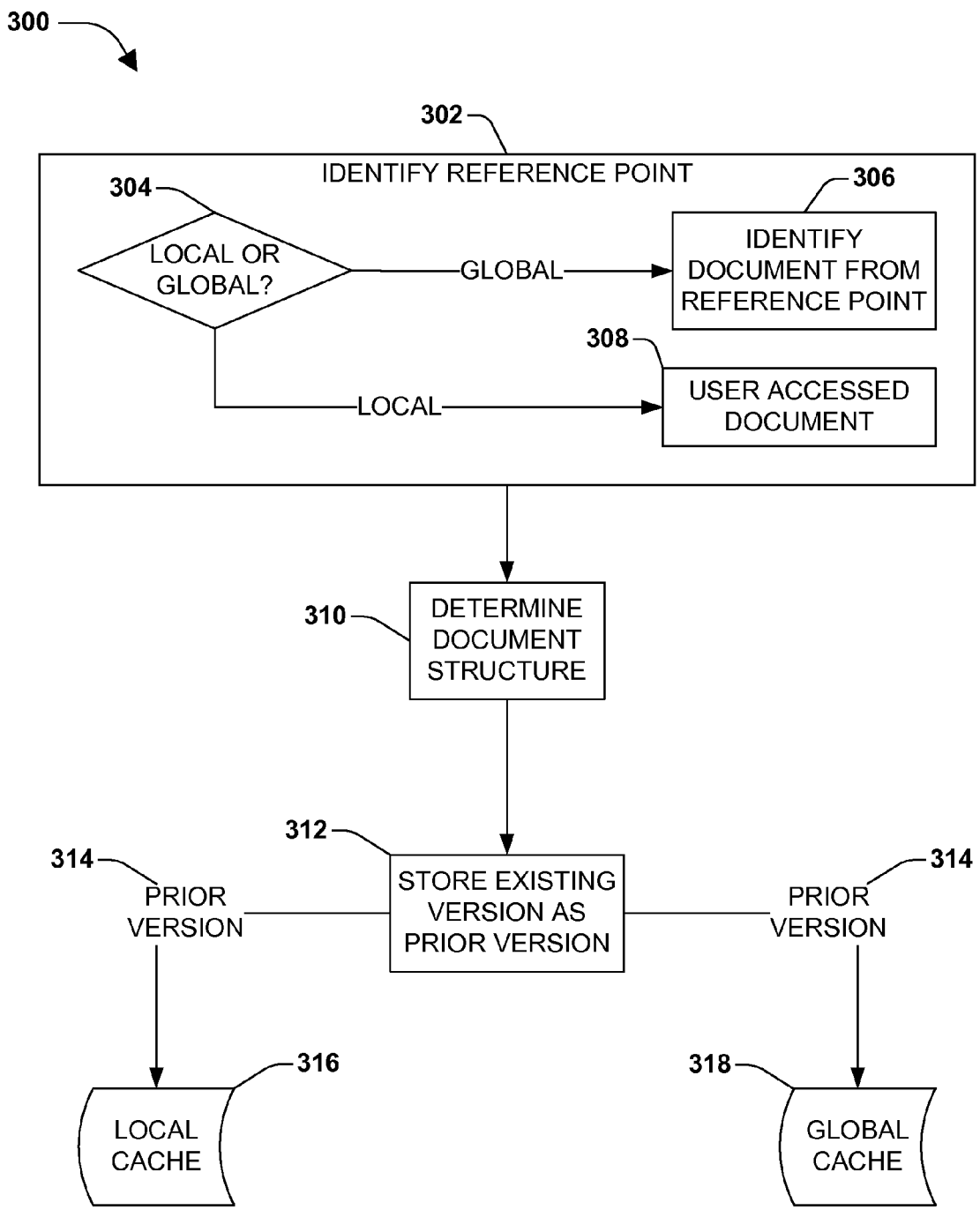
FIG. 3 is a flow-chart diagram illustrating one embodiment of a portion of a method where prior versions of a document can be identified and stored.

FIG. 3 is a flow-chart diagram illustrating one embodiment 300 of a portion of a method where prior versions of a document can be identified and stored. At 302, a reference point for an online document can be identified. At 304, if the document reference point is global, such as referring to an existing version of a web-page available online (e.g., a reference point from an online web-page archiving service that stores and archives existing older versions of web-pages) the document can be identified online from the reference point, at 306.

In one embodiment, once the document is identified from the global reference point, the document may not need to be stored. Because it has a global reference point already pointing to an existing storage location, the document can later be retrieved from that remote storage location when it is called for, using that reference point. In another embodiment, if the reference point is local, at 304, such as referring to an existing version of a web-page accessed by the user, the reference point can identify the online document that was accessed by the user at a previous point, at 308. For example, a local reference point may point to a document that was accessed by the user at some point, whereas the global reference point can point to a document that has not been accessed by the user, but that the user intends to access.

At 310, the structure of the document can be determined, such as by a type of document or construction of the document. For example, a document may comprise an image file, a text-based file, web-page based code, DOM elements, dynamic elements, or a plurality of other types of files and elements or combination thereof. In this example 300, the structure of the document can be determined in order to provide for compatible storage. At 312, the existing version of the document can be stored as a prior version, such as when the user accesses the online document.

For example, when a user access a document online (e.g., a web-based document file) that version of the document (existing version) can be cached locally 316 as a prior version for future use 314. Further, the existing document may be stored in a global cache 318 (e.g., remotely) as a previous version 314, such as in an online document archive. However if one or more prior versions of the document are stored, the reference point can be used to locate the stored version(s), for example.

In one embodiment, storing an existing version of the document can comprise storing merely differences between a prior stored version and a current stored version. For example, a user may access a web-page on a first day and that first version can be cached. On a second day, the user accesses a second version of that web-page. In this example, instead of storing both versions, merely the differences between the first and second versions can be cached. Additionally, data in a cache (e.g., either remotely or locally) that identifies when the user accessed the document, for example, thereby providing reference points for when the document was accessed.

In one aspect, online documents may have various structures and can be stored and compared in various ways. In one embodiment, the document can be stored in a graphical-structure representation, such as a DOM element tree structure. In another embodiment, the document can be stored as an image-based representation, such as an image file (or multiple image files) of the web-page. In another embodiment, the document can be stored as a text-based representation, such as a word-processor based document. In another embodiment, the document can be stored as a code-based representation, such as an HTML file. In this way, in these embodiments, the stored documents can be compared with current documents based on the structure of the documents.

It will be appreciated that, while an existing version of a document can be stored either locally or remotely as a prior version, for later retrieval using the reference point prior to element comparison, the methods and systems described herein are not limited to these embodiments. For example, a reference point may refer to an existing document online that is a prior version of the document accessed by the user. In this example, the prior version may not need to be stored and the global reference point can be used to retrieve the document.

Figure 4:
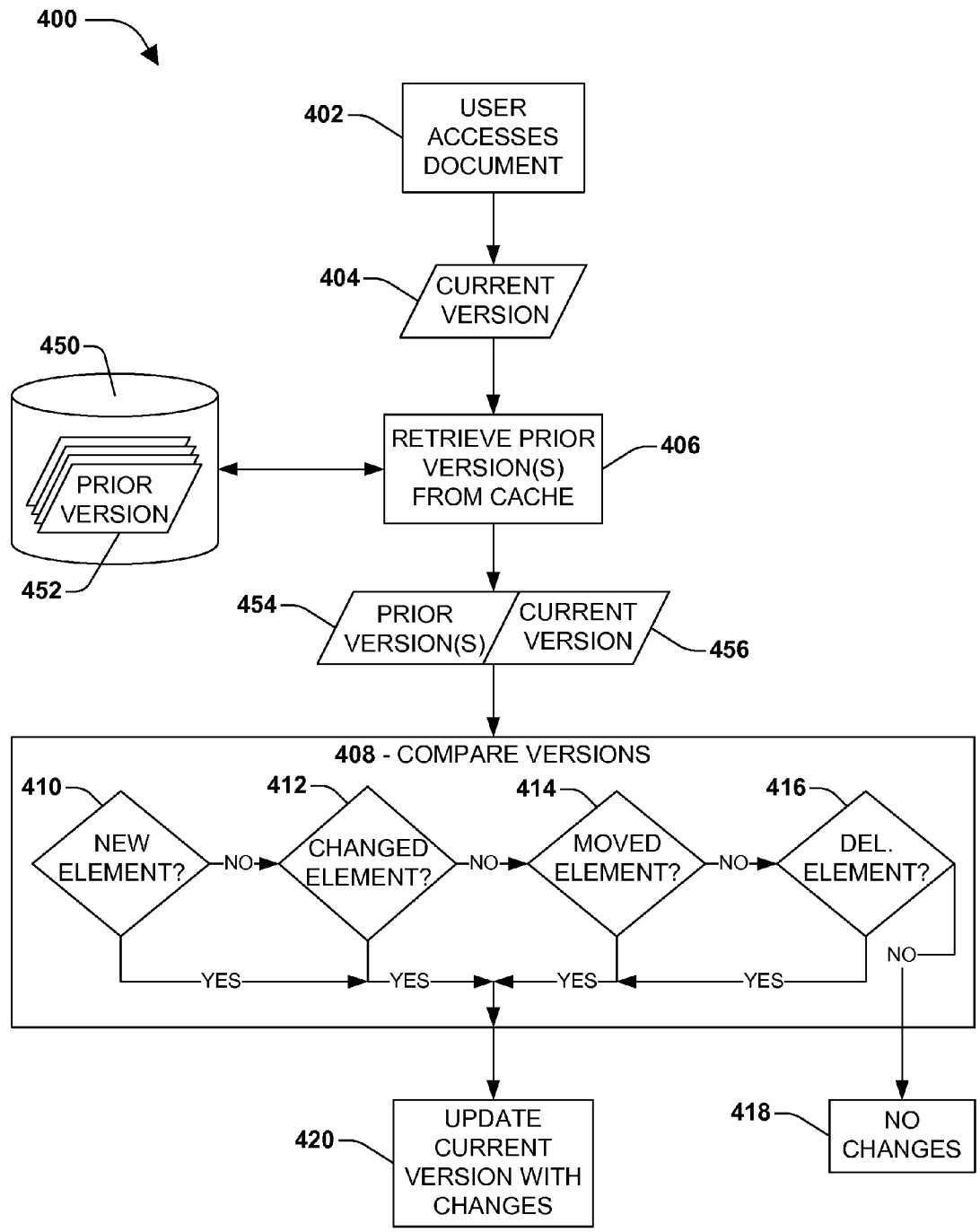
FIG. 4 is a flow-chart diagram illustrating one embodiment of a portion of a method where changes to an online document can be identified.

FIG. 4 is a flow-chart diagram illustrating one embodiment 400 of a portion of a method where changes to an online document can be identified. At 402, the user accesses the online document, for example, by navigating a browser to a web-site hosting the document (e.g., web-page). The current version of the document 404 is retrieved (e.g., by the browser), for example, for viewing by the user.

At 406, one or more prior versions 452 of the document are retrieved, using the reference point. A storage location 450 may comprise a local cache on the user's machine, and/or a remote storage location, such as a remote server or server farm. While a typical user may merely wish to identify document changes between the current version 404 and a most recent prior version, a plurality of prior versions 452 may be cached and retrieved for comparison with the current version 404.

At 408, the current version of the document 456 and the retrieved one or more prior versions 454 are compared to determine if there are differences (changes) between them, such as by comparing the DOM trees for the current and prior version. Comparing elements can comprise determining whether a new element has been added between the prior and current versions, at 410. Further, it can be determined whether an element has been changed between the prior and current versions, at 412. Additionally, it can be determined whether an element has been moved between the prior and current versions, at 414. It can also be determined whether an element has been deleted between the prior and current versions, at 416.

If no differences are identified between the prior version and the current version, no changes are made to the current version of the document, at 418. However, if one or more differences are identified, the current version of the document can be updated to draw attention to the user, at 420. As described above, a visual representation of the changed elements can be altered for the current version. In this way, for example, the user may more readily be able to identify the differences between the prior and current versions (e.g., as shown in 210 and 212 of FIG. 2).

In one aspect, determining whether an element has changed between versions may be performed in a plurality of ways. For example, detecting a change between DOM element trees may be different than detecting changes between images. In one embodiment, determining whether an element has been changed can comprise applying a function to the prior version and to the current version to yield results. These results can be compared to determine whether there is a difference, within a desired threshold.

For example, where the documents are stored as DOM element trees, the DOM trees can be run through some hash function, and the versions can be compared by looking at how the trees of hash function outputs differ in a depth-first manner. In this example, starting at a root of the trees, a pre-computed subtrees can be compared, and if the subtree hashes are the same the content has not changed. For those subtrees that do not match, the comparison can traverse down branches to detect the changed element.

In another aspect, representations of the documents (e.g., web-pages) that a user accesses (e.g., visits) can be stored locally on a client machine (e.g., user's computer), or may be stored remotely (e.g., on a remote server). While modern browsers comprise caching mechanisms that save previously viewed content, these types of caches are typically used for performance purposes (e.g., to speed loading of a page). In one embodiment, a parallel cache can be created for version comparison, for example, so that an application can control cache expiration and store multiple versions of a same document.

In one embodiment, representation of the document can be tied to a particular identity, such as a web-page tied to a URL, and/or a timestamp that indicates when the document was accessed. For example, a file naming scheme may be utilized, with respective representations stored in a file named with a hash of its identity (e.g., URL), followed by a time and date. Further, an amount of disk or volatile memory space used for the cache can be configurable, along with an expiration time for files. In this way, in this example, older pages can be deleted to make room for new content. Additionally, a number of desired versions for a document can be set for the cache, thereby deleting older versions as new one are cached.

Figure 5:
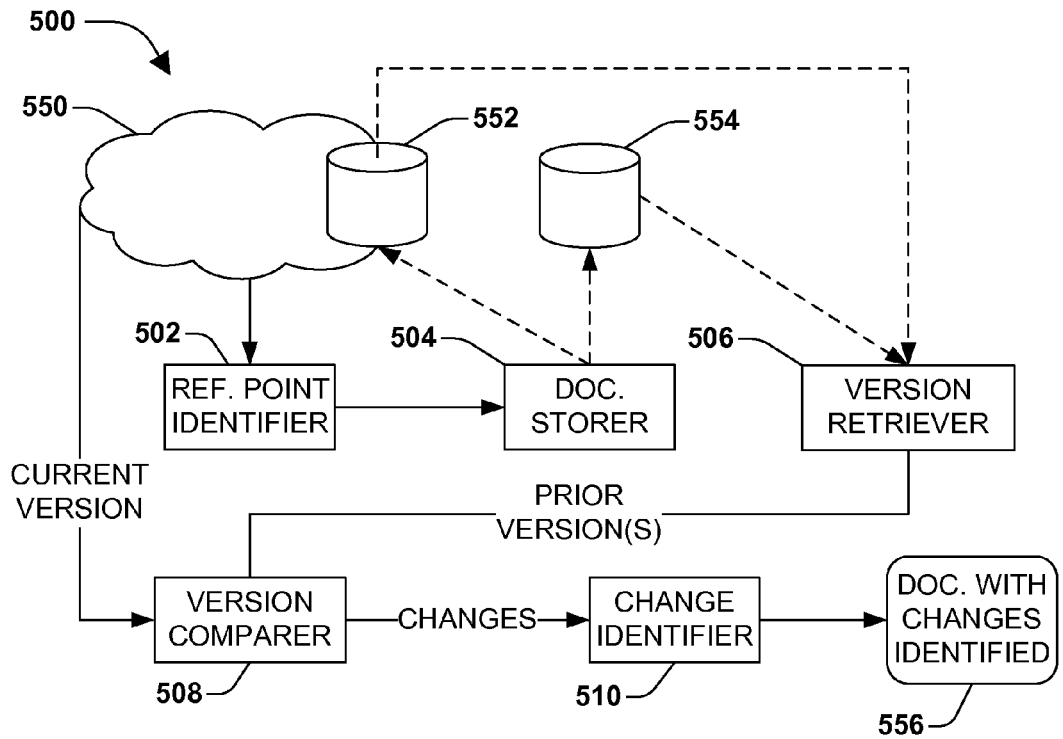
FIG. 5 is a component block diagram of an exemplary system for providing changed content identification for an online document that is accessed by a user.

A system may be devised that can provide awareness to users that some content has changed on an online document (e.g., web-page), for example, since a last time they accessed the document online. Changes in the content can be indicated to user without interfering with an existing web-browsing experience, for example. FIG. 5 is a component block diagram of an exemplary system 500 for providing changed content identification for an online document that is accessed by a user.

A reference point identification component 502 identifies a reference point for an online document that a user is interested in accessing, such as from the Internet or an intranet 550. A document storing component 504 can provide for storing of an existing version of the document associated with the reference point as a prior version of that document. The document storing component 504 may have the prior version stored on a remote storage component 552, and/or a local storage component 554, such as a local cache configured for storing prior versions. In one embodiment, the document storing component 504 can comprise a differentiation component that identifies merely differences between a prior stored version and a current stored version, and provides the differences for storage. In this way, for example, storage space may be saved by storing merely differences instead of entire documents.

When the user accesses a current version of the online document associated with the reference point, a version retrieval component 506 retrieves the prior version, for example, either from the remote storage 552 or local storage 554. A version comparison component 508 compares elements of the prior version (or versions) with elements of the current version of the document accessed by the user. Changes identified by the version comparison component 508 are used by a change identification component 510 to automatically update the current version with visual representations that identify the changes from the prior version to the current version 556.

Therefore, the document accessed by the user can be displayed in a manner that identifies changes 556 between the prior and current versions. For example, while the current version of the document is loading in a browser, the prior version can be retrieved and compared with the current version. In this example, the visual representations of the changes can be loaded on the current version when it is fully loaded into the browser.

In one embodiment, the exemplary system may comprise an element comparison selection component that a can be used to determine which elements of the version to compare. In one embodiment, the element comparison selection component can identify elements for comparison that have been selected by the user for comparison, such as those that are of particular interest to the user. In another embodiment, the element comparison selection component can identify elements for comparison based on the user's document accessing patterns, such as how and when the user accesses documents of particular types, and for what purpose. In another embodiment, the element comparison selection component can identify elements for comparison based on global document accessing patterns, for example, where users typically access blogs merely to see if there has been an update.

Figure 6:
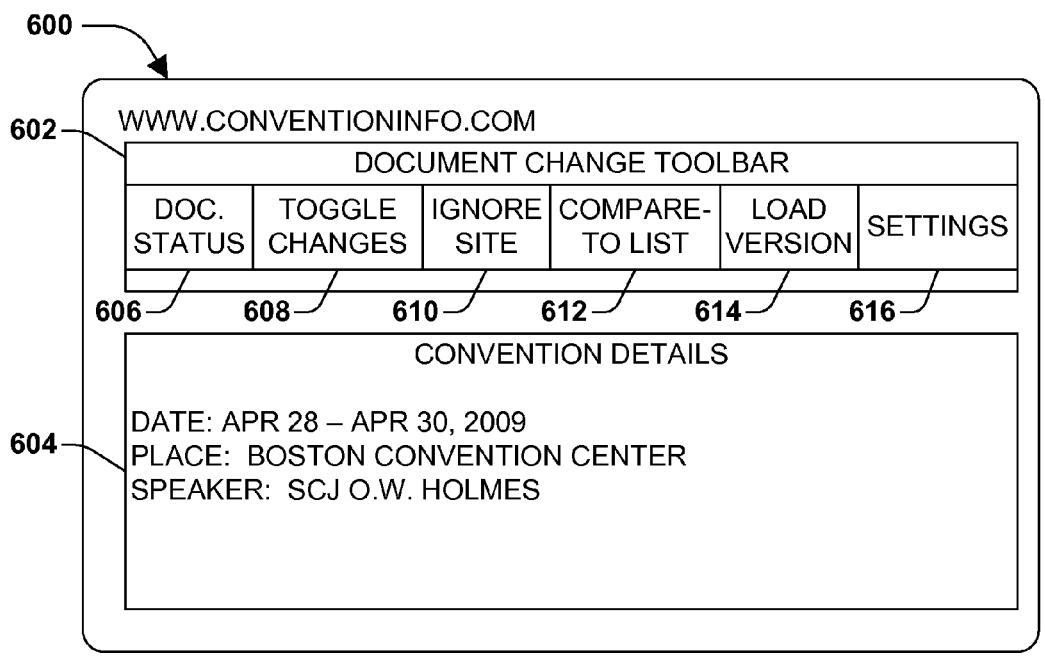
FIG. 6 is an illustration of an exemplary environment that can be used to implement an application plug-in as provided herein.

In one embodiment, the system for providing changed content identification for an online document that is accessed by a user can be comprised in an application plug-in component that is operably coupled with an application that is utilized to access the documents (e.g., a web-browser application). FIG. 6 is an illustration of an exemplary environment 600 that can be used to implement the application plug-in.

In this example, a web-browser 600 is used to access a website (www.conventioninfo.com), so that the user can view its content 604. The application plug-in component can comprise a user interface 602 (UI) configured to provide system configuration operations to the user. In this example, the UI is a toolbar 602 that may be located in the browser above the web-page, and can be present as the user uses the browser to view online content 604 (e.g., surfs the web).

As an example, the toolbar 602 comprises user configuration settings for the application. A document status area 606 allows the user to view what is currently happening (e.g., state of page). A toggle changes button 608 allow the user to turn on or off the visual change indications (e.g., highlighting) on the current page. An ignore site button 610 allows the user to blacklist the current site from version comparison, for example, for secure sites or pages that change entirely. A compare-to list button 612, allows the user to select a plurality of prior versions of the current document, such as those stored in the cache, to compare with the current version, or compare with each other. A load version button 614, allows the user to select a prior version to load into the browser. A setting button 616 can open a settings dialog that allows selection of various controls for the application, such as visual representation types, turning the comparison system on or off, controlling blacklisted sites, and directing a size of the cache.

Figure 7:
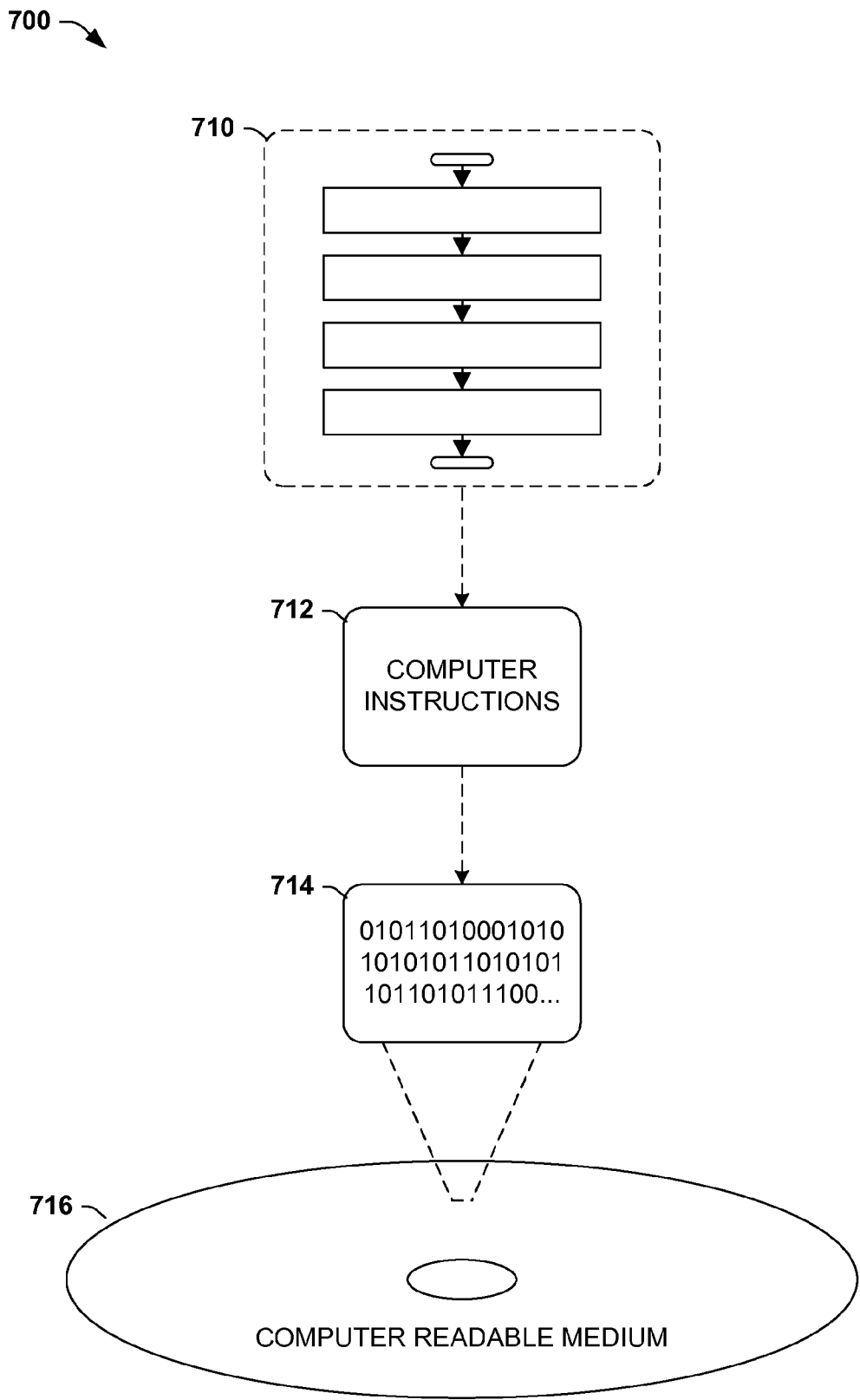
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as the exemplary method 100 of FIG. 1, for example. In another such embodiment, the processor-executable instructions 704 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
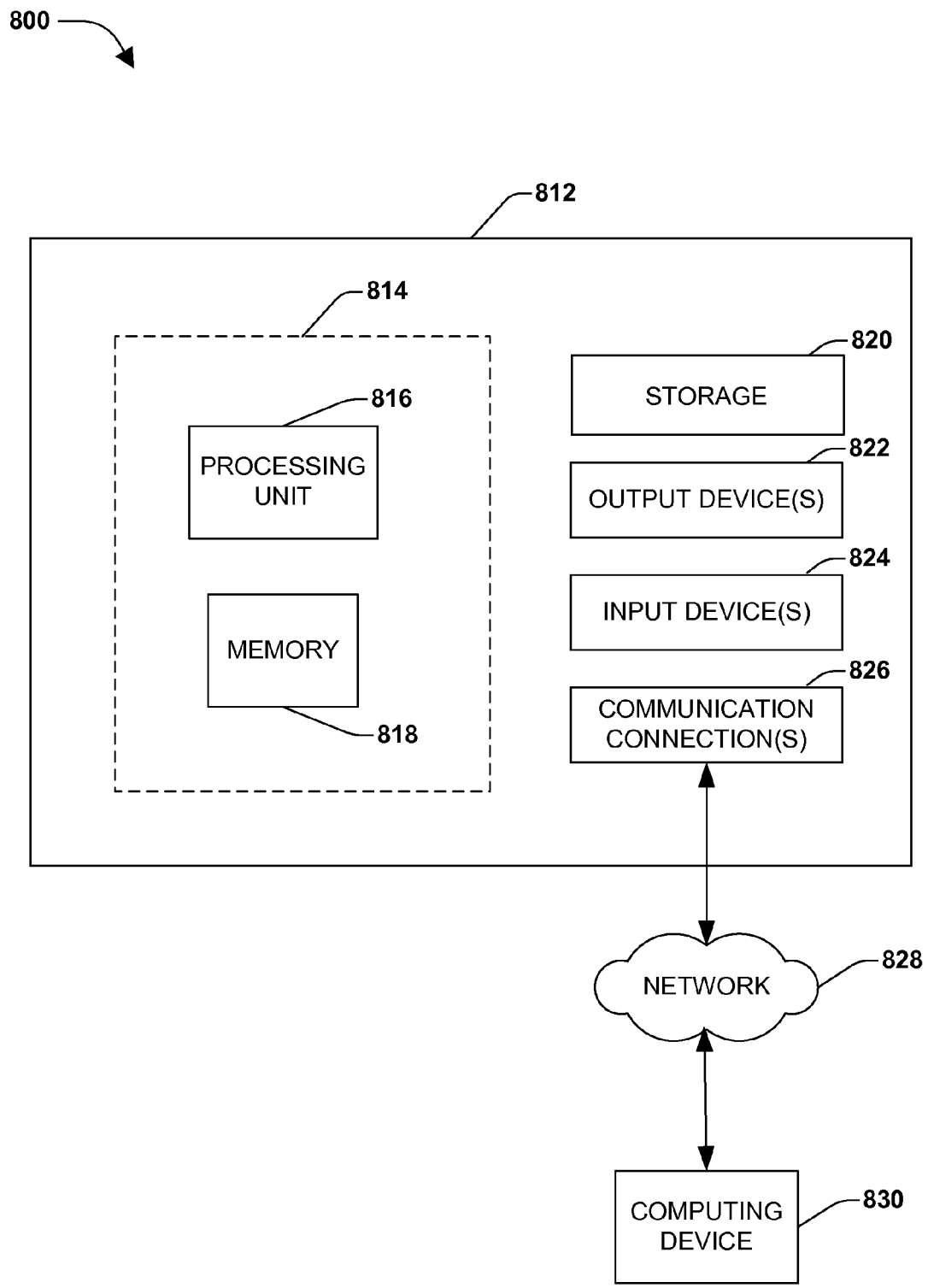
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for identifying changed content for a document, comprising:
   generating a parallel cache configured to store multiple versions of a document;
   receiving an access request to access a current version of the document; and
   responsive to receiving the access request:
   identifying a reference point associated with the document, the reference point referencing a prior version of the document stored in the parallel cache, the prior version of the document comprising one or more elements;
   comparing at least some of the one or more elements associated with the prior version of the document with one or more elements associated with the current version of the document;
   updating the current version of the document to generate an updated current version of the document, the updating comprising updating the current version of the document with at least one of a visual representation or an auditory representation based upon differences between the one or more elements associated with the prior version of the document and the one or more elements associated with the current version of the document; and
   presenting the updated current version of the document for display, at least some of the method implemented at least in part via a processing unit;
   wherein the one or more elements associated with the prior version of the document is stored as a first document object model (DOM) element tree and the one or more elements associated with the current version of the document stored as a second DOM element tree.

2. The method of claim 1, the reference point comprising a timestamp indicating when a user previously accessed the document.

3. The method of claim 2, the prior version of the document corresponding to a version of the document available for access at a time corresponding to the timestamp.

4. The method of claim 1, the comparing comprising identifying a set of differences between the one or more elements associated with the prior version of the document and the one or more elements associated with the current version of the document.

5. The method of claim 1, further comprising storing the prior version of the document based at least in part on a document object model.

6. The method of claim 1, further comprising determining whether a new element has been added to the document between the prior version of the document and the current version of the document.

7. The method of claim 1, the comparing comprising determining whether an element has been changed within the document between the prior version of the document and the current version of the document.

8. The method of claim 1, the comparing comprising determining whether an element has been removed from the document between the prior version of the document and the current version of the document.

9. The method of claim 1, the comparing comprising determining whether an element has been moved within the document between the prior version of the document and the current version of the document.

10. The method of claim 1, comprising inferring differences to emphasize based upon tracking data associated with a user to which the updated current version of the document is presented.

11. A system for identifying changed content for a document, comprising:
 one or more processing units; and
 memory comprising instructions that when executed by at least one of the one or more processing units perform operations, the operations comprising:
  generating a parallel cache configured to store multiple versions of a document;
  receiving an access request to access a current version of the document; and
  responsive to receiving the access request:
   identifying a reference point associated with the document, the reference point referencing a prior version of the document stored in the parallel cache, the prior version of the document comprising one or more elements;
   comparing at least some of the one or more elements associated with the prior version of the document with one or more elements associated with the current version of the document;
   updating the current version of the document to generate an updated current version of the document, the updating comprising updating the current version of the document with at least one of a visual representation or an auditory representation based upon differences between the one or more elements associated with the prior version of the document and the one or more elements associated with the current version of the document; and
   presenting the updated current version of the document for display;
  wherein the one or more elements associated with the prior version of the document is stored as a first document object model (DOM) element tree and the one or more elements associated with the current version of the document stored as a second DOM element tree.

12. The system of claim 11, wherein the comparing further comprises:
 performing a first hash function on the first DOM element tree to generate a first hash function output;
 performing a second hash function on the second DOM element tree to generate a second hash function output; and
 comparing the first hash function output to the second hash function output.

13. The system of claim 12, the comparing the first hash function output to the second hash function output comprising:
 identifying a mismatch between the first hash function output and the second hash function output; and
 responsive to the identifying a mismatch, traversing a branch of the first DOM element tree and a corresponding branch of the second DOM element tree to detect a difference between an element associated with the first DOM element tree and a corresponding element associated with the second DOM element tree.

14. The system of claim 11, comprising storing the prior version of the document within a cache of a client machine.

15. The system of claim 11, the reference point comprising a timestamp indicating when a user previously accessed the document.

16. The system of claim 15, the prior version of the document corresponding to a version of the document available for access at a time corresponding to the timestamp.

17. A computer-readable storage device comprising instructions that when executed via a processing performs acts, comprising:
 generating a parallel cache configured to store multiple versions of a document;
 receiving an access request to access a current version of the document; and
 responsive to receiving the access request:
  identifying a reference point associated with the document, the reference point referencing a prior version of the document stored in the parallel cache, the prior version of the document comprising one or more elements;
  comparing at least some of the one or more elements associated with the prior version of the document with one or more elements associated with the current version of the document;
  updating the current version of the document to generate an updated current version of the document, the updating comprising updating the current version of the document with at least one of a visual representation or an auditory representation based upon differences between the one or more elements associated with the prior version of the document and the one or more elements associated with the current version of the document; and
  presenting the updated current version of the document for display;
 wherein the one or more elements associated with the prior version of the document is stored as a first document object model (DOM) element tree and the one or more elements associated with the current version of the document stored as a second DOM element tree.

18. The computer-readable storage device of claim 17, the reference point comprising a timestamp indicating when a user previously accessed the document.

19. The computer-readable storage device of claim 18, the prior version of the document corresponding to a version of the document available for access at a time corresponding to the timestamp.

20. The computer-readable storage device of claim 17, wherein the comparing further comprises:
 performing a first hash function on the first DOM element tree to generate a first hash function output;
 performing a second hash function on the second DOM element tree to generate a second hash function output; and
 comparing the first hash function output to the second hash function output.

* * * * *